United States Patent
Pokhama et al.

(10) Patent No.: US 7,281,388 B2
(45) Date of Patent: Oct. 16, 2007

(54) APPARATUS TO USE A REFRIGERATOR IN MOBILE COMPUTING DEVICE

(75) Inventors: Himanshu Pokhama, San Jose, CA (US); Rajiv K. Mongia, Portland, OR (US); Eric DiStefano, Livermore, CA (US)

(73) Assignee: Intel Corporation, Santa Clara, CA (US)

( * ) Notice: Subject to any disclaimer, the term of this patent is extended or adjusted under 35 U.S.C. 154(b) by 512 days.

(21) Appl. No.: 10/816,009

(22) Filed: Mar. 31, 2004

(65) Prior Publication Data

US 2005/0217827 A1 Oct. 6, 2005

(51) Int. Cl.
*F25B 9/00* (2006.01)
*F25D 23/12* (2006.01)

(52) U.S. Cl. .......................................... 62/259.2; 62/6

(58) Field of Classification Search ............. 62/259.2, 62/6
See application file for complete search history.

(56) References Cited

U.S. PATENT DOCUMENTS

| | | | |
|---|---|---|---|
| 5,303,555 A * | 4/1994 | Chrysler et al. ................. | 62/6 |
| 5,711,155 A * | 1/1998 | DeVilbiss et al. ............. | 62/3.7 |
| 6,034,872 A * | 3/2000 | Chrysler et al. ............. | 361/699 |
| 6,324,058 B1 * | 11/2001 | Hsiao .......................... | 361/699 |
| 6,526,768 B2 * | 3/2003 | Wall et al. ..................... | 62/184 |
| 6,837,058 B1 * | 1/2005 | McEuen et al. .............. | 62/3.2 |
| 6,837,063 B1 * | 1/2005 | Hood et al. ................. | 62/259.2 |
| 6,970,355 B2 * | 11/2005 | Ellsworth et al. ........... | 361/694 |
| 7,120,021 B2 * | 10/2006 | Hamman ..................... | 361/699 |
| 2001/0008071 A1 * | 7/2001 | Macias et al. ................ | 62/3.7 |
| 2002/0066283 A1 * | 6/2002 | Oh et al. .................... | 62/259.2 |
| 2002/0183032 A1 * | 12/2002 | Fang ........................... | 455/280 |
| 2004/0047139 A1 * | 3/2004 | Homer et al. ................ | 361/816 |
| 2004/0201528 A1 * | 10/2004 | Lee et al. .................... | 343/702 |
| 2004/0222928 A1 * | 11/2004 | Chen ........................... | 343/702 |

* cited by examiner

*Primary Examiner*—William C Doerrler
(74) *Attorney, Agent, or Firm*—Cyndi M. Wheeler

(57) ABSTRACT

An apparatus to use a refrigerator in a mobile computing device is described. In one embodiment, the refrigerator includes a cold reservoir to absorb heat generated by a heat generating unit of the mobile device. A heat exchanger is used to dissipate heat of a hot reservoir of the refrigerator. In an alternative embodiment, the apparatus includes a working fluid loop, with a fluid of the loop to be in thermal contact with the heat generating device, and the cold reservoir of the refrigerator to absorb heat from the fluid.

11 Claims, 4 Drawing Sheets

APPARATUS TO USE A REFRIGERATOR IN MOBILE COMPUTING DEVICE

FIELD OF INVENTION

The field of invention relates generally to heat management and more particularly to heat management using a refrigerator in a mobile computing device.

BACKGROUND

Heat management can be critical in many applications. Excessive heat can cause damage to or degrade the performance of mechanical, chemical, electric, and other types of devices. Heat management becomes more critical as technology advances and newer devices continue to become smaller and more complex, and as a result run at higher power levels and/or power densities.

Modern electronic circuits, because of their high density and small size, often generate a substantial amount of heat. Complex integrated circuits (ICs), especially microprocessors, generate so much heat that they are often unable to operate without some sort of cooling system. Further, even if an IC is able to operate, excess heat can degrade an IC's performance and can adversely affect its reliability over time. Inadequate cooling can cause problems in central processing units (CPUs) used in personal computers (PCs), which can result in system crashes, lockups, surprise reboots, and other errors. The risk of such problems can become especially acute in the tight confines found inside mobile computers and other portable computing and electronic devices.

Prior methods for dealing with such cooling problems have included using heat sinks, fans, and combinations of heat sinks and fans attached to ICs and other circuitry in order to cool them. However, in many applications, including mobile and handheld computers, computers with powerful processors, and other devices that are small or have limited space, these methods may provide inadequate cooling.

DETAILED DESCRIPTION

An apparatus to use a refrigerator in a mobile computing device is described. In one embodiment, the refrigerator includes a cold reservoir to absorb heat generated by a heat generating unit of the mobile device. A heat exchanger is used to dissipate heat of a hot reservoir of the refrigerator. In an alternative embodiment, the apparatus includes a working fluid loop, with fluid of the loop in thermal contact with the heat generating device, and the cold reservoir of the refrigerator to absorb heat from the fluid.

In the following description, numerous specific details are set forth. However, it is understood that embodiments may be practiced without these specific details. In other instances, well-known circuits, structures and techniques have not been shown in detail in order not to obscure the understanding of this description.

Reference throughout this specification to "one embodiment" or "an embodiment" indicate that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments. In addition, as described herein, a trusted platform, components, units, or subunits thereof, are interchangeably referenced as protected or secured.

Figure 1:
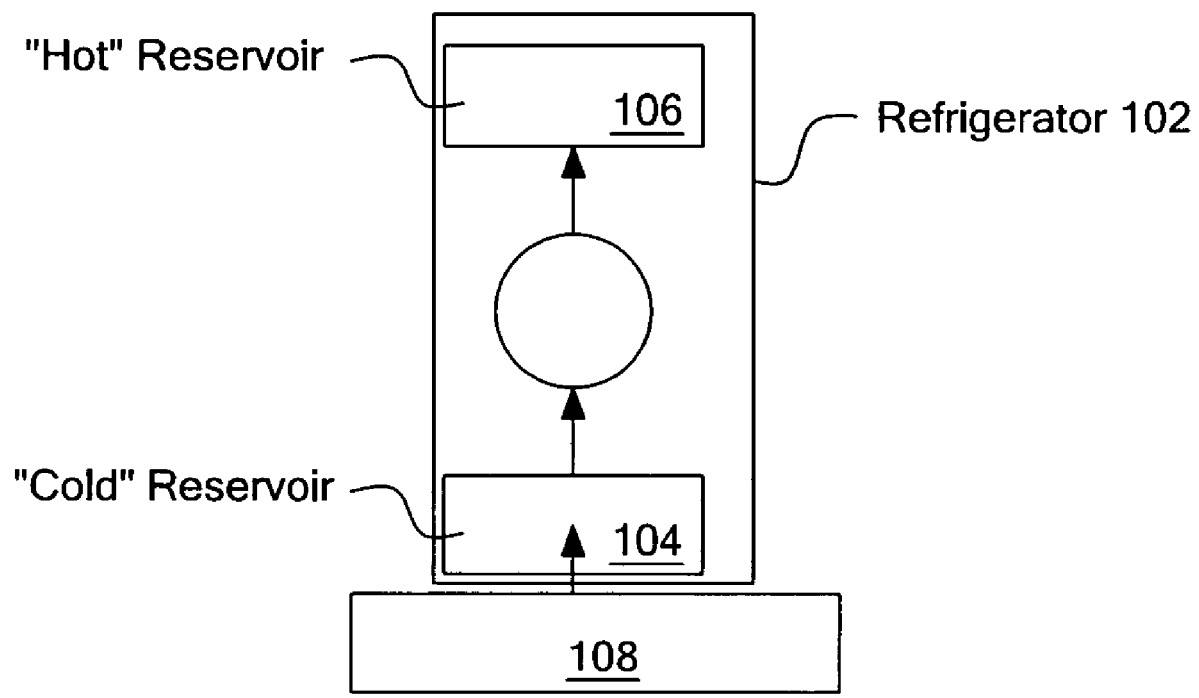
FIG. 1 present an illustration of a refrigerator for thermal management of a heat generating unit within a mobile computing device, in accordance with one embodiment.
Figure 2:
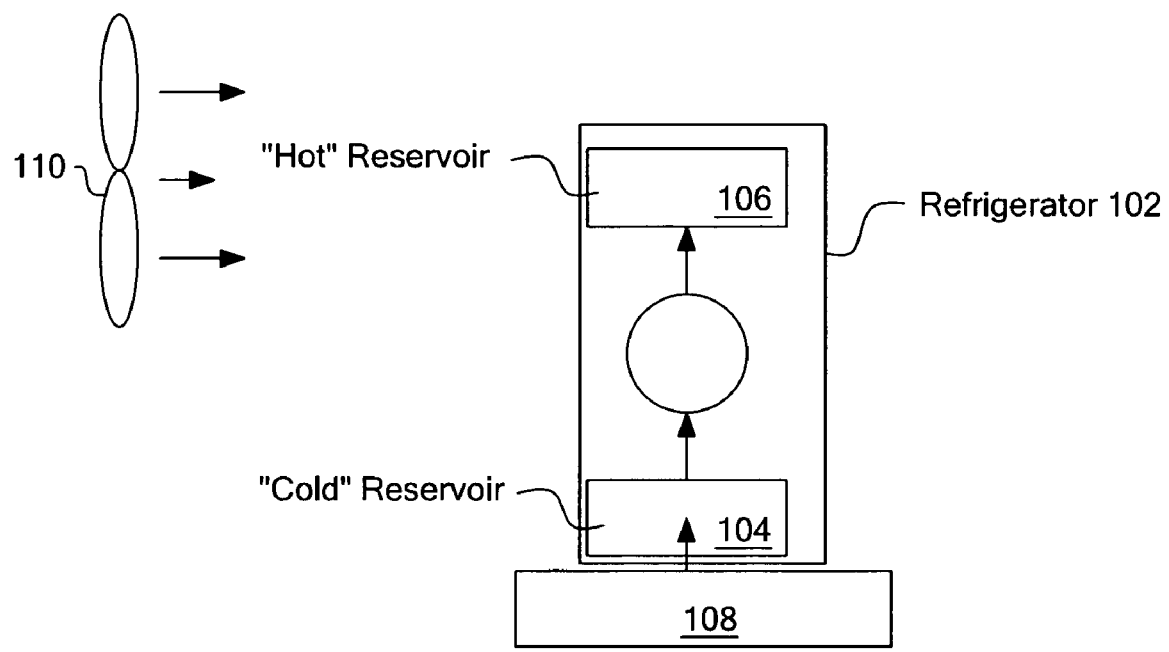
FIG. 2 present an illustration of a refrigerator for thermal management of a heat generating unit within a mobile computing device, in accordance with an alternative embodiment.

FIG. 1 illustrates one embodiment of a refrigerator for thermal management of a heat generating unit within a mobile computing device. As illustrated, the refrigerator 102 includes a cold reservoir 104 and a hot reservoir 106. The cold reservoir absorbs heat generated by a heat generating component 108 within the computer system. The heat generating component may include a processor, a chipset, a graphics controller, a memory controller, and other alternative heat generating components.

In one embodiment, the cold reservoir 104 is in thermal contact with the heat generating component 108. In one embodiment, as illustrated in FIG. 1, heat from the heat generating unit is transferred to the cold reservoir 104 of the refrigerator 102. The heat is then transferred to the hot reservoir 106, where the heat dissipates. The refrigerator used with the techniques, as described herein, may be either of a vapor compression, a thermoelectric, thermoionic, a magnetic, a thermo acoustic, an absorption, or adsorption refrigerator. Other types of refrigerators may also be used.

In an alternative embodiment, a heat exchanger is used to dissipate heat from the hot reservoir 106 of the refrigerator 102. In one embodiment, a heat exchanger fan 110 may be provided to supply air across the heat exchanger 112.

Figure 3:
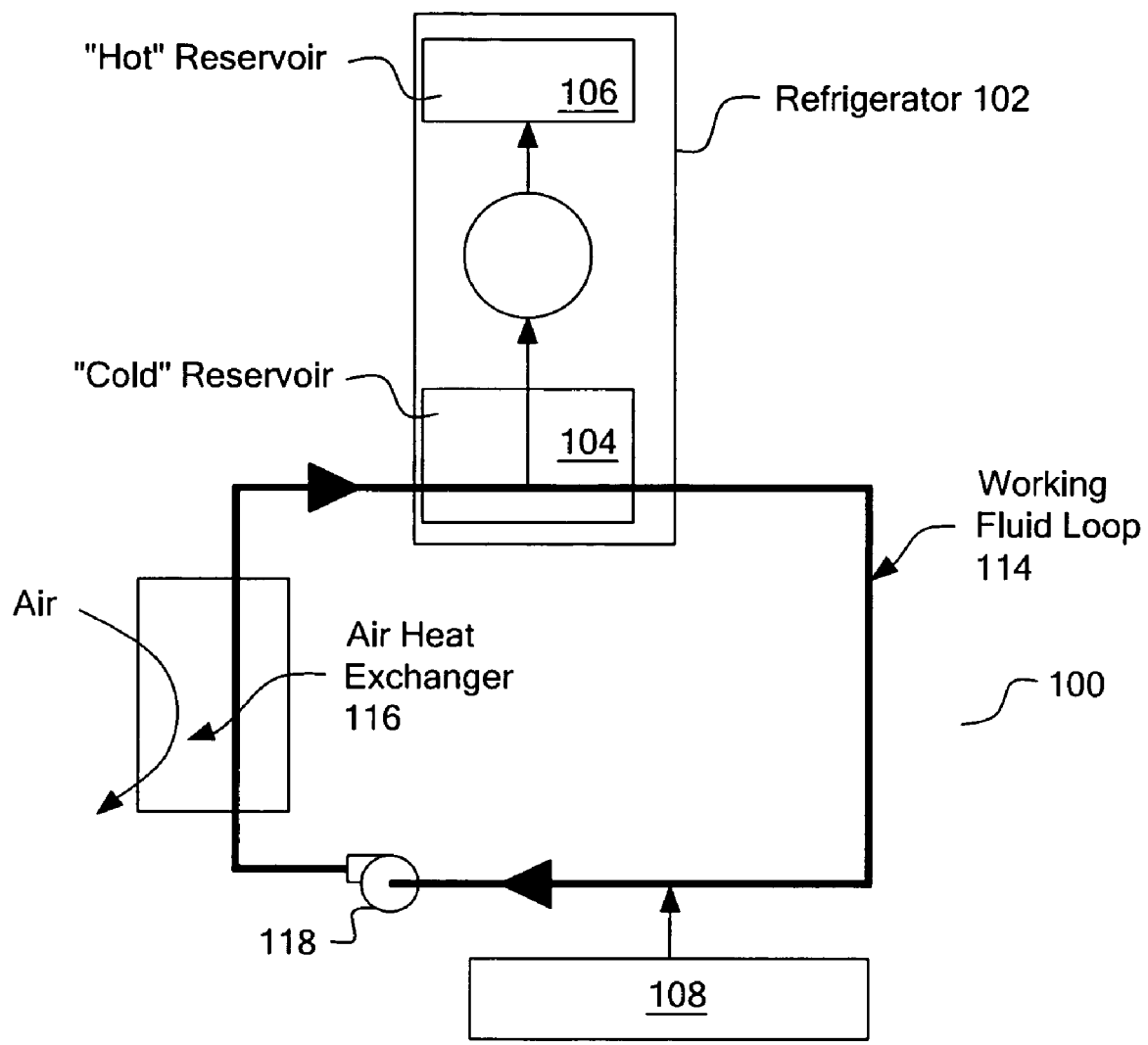
FIG. 3 present an illustration of a refrigerator for thermal management of a heat generating unit within a mobile computing device, in accordance with an alternative embodiment.

In an alternative embodiment illustrated in FIG. 3, a working fluid loop 114 within the computing device 100 is used in conjunction with the refrigerator 102 to absorb heat of the component 108. As illustrated, the fluid of the loop 114 is pumped across the component 108, to absorb heat from the component. In one embodiment, working fluid loop 114 passes across or through a cold plate (not shown) thermally attached to the component 108 to absorb and transfer heat from the cold plate to loop 114. In one embodiment, a pump 118 is used to move the fluid through the working fluid loop 114. In an alternative embodiment, other ways of moving the fluid may be used.

Thereafter, the working fluid and/or vapor are passed through a heat exchanger 116 to dissipate heat. In one embodiment, the heat exchanger 116 is a fluid to air heat exchanger, wherein the fluid passes through a thermally conductive tube that may include fins attached to the tube to dissipate the heat from the working fluid and/or the vapor. A fan may be used to blow across the channels to dissipate the heat.

Thereafter, the working fluid of the loop 114 is passed across the cold reservoir 104 of the refrigerator 102, which absorbs additional heat from the working fluid. The working fluid of the loop 114 returns across the heat generating component 108, as described above. As illustrated in FIG. 3, the refrigerator 102 is located remotely from the heat generating component 108, in accordance with one embodiment. Alternatively, the refrigerator 102 may be located outside the mobile computing system in a docking station, or possibly as an external module.

In one embodiment, the refrigerator 102 can be turned on or off based on a predetermined event, such as a temperature of the heat generating component 108, an internal ambient temperature of the computing device 100, a level of power provided to the component 108, whether the computing device 100 is receiving power from a battery source or power from an AC outlet, or other events.

Figure 4:
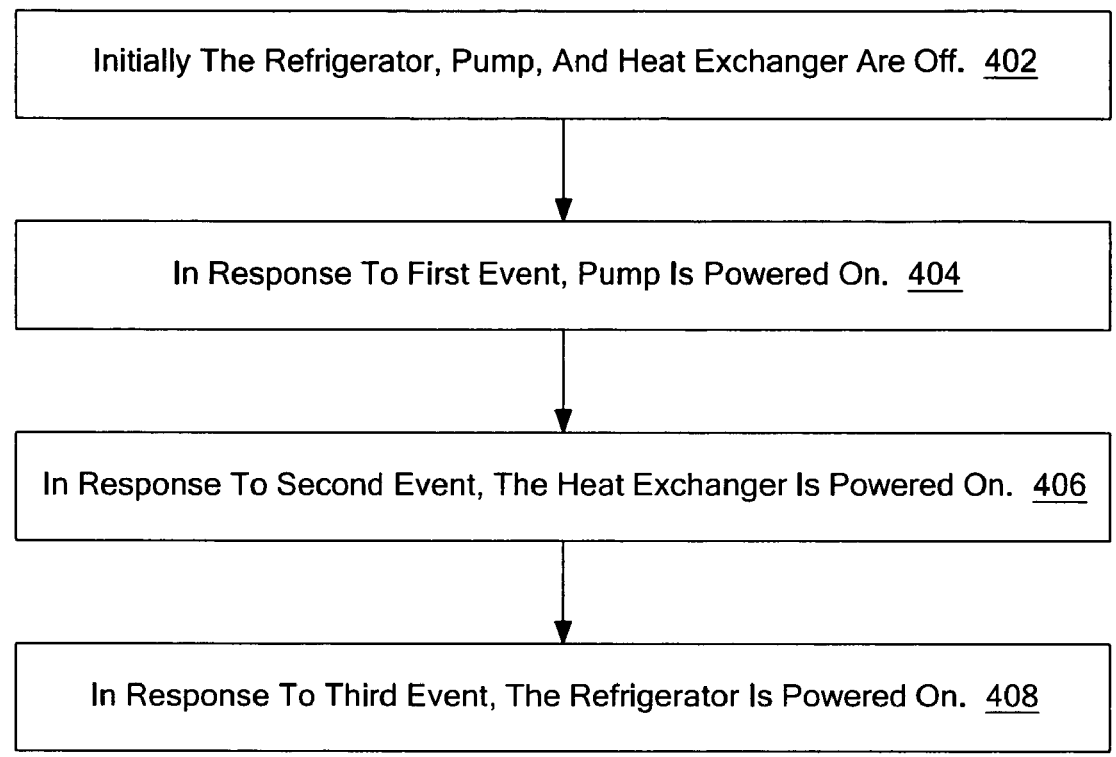
FIG. 4 presents a flow diagram describing a process of using a refrigerator for thermal management of a heat generating unit within a mobile computing device, in accordance with one embodiment.

The flow diagram of FIG. 4. describes an example embodiment of the refrigerator 102 that is able to be turned on or off based on a temperature of the component 108.

In process 402, the refrigerator 102, a pump 118 of the fluid loop 114, and the heat exchanger fan 110 are off. In process 404, in response to the temperature of component 108 reaching a predetermined level a first time, the pump 118 is powered on, and the refrigerator and heat exchanger fan remain off. In process 406, in response to the temperature of component 108 reaching a predetermined level a second time, or reaching a separate predetermined level a first time, the heat exchanger fan is powered on, and the refrigerator remains off Alternatively, the heat exchanger is powered on, and not the fan. In process 408, in response to the temperature of component 108 reaching a predetermined level a third time, or reaching a separate predetermined level a first time, the refrigerator is powered on. In alternative embodiments, the units, and the sequence of the units being powered on may vary. Also the predetermined events that trigger the units to be powered on, may vary.

In the foregoing specification, the invention has been described with reference to specific exemplary embodiments thereof. It will, however, be evident that various modifications and changes may be made thereto without departing from the broader spirit and scope of the invention as set forth in the appended claims. For example, in one embodiment, the foregoing thermal management technique could be provided in a mobile computing device having a wireless antenna to communicate wirelessly with separate devices. In another example, the above described thermal management technique could be applied to desktop computer device. The specification and drawings are, accordingly, to be regarded in an illustrative rather than a restrictive sense.

The invention claimed is:

1. An apparatus comprising:
a refrigerator to absorb heat generated by a heat generating unit for a mobile computing device, the refrigerator to include a cold reservoir and a hot reservoir, the cold reservoir to be in thermal contact with a working fluid loop, a fluid of the working fluid loop being in thermal contact with the heat generating unit, wherein a pump of the working fluid loop is powered off in response to the mobile computing device receiving power from a battery power source.

2. The apparatus of claim 1, wherein the refrigerator is located in a docking station for the mobile computing device.

3. The apparatus of claim 1, further including a heat exchanger to dissipate heat from the hot reservoir.

4. The apparatus of claim 1, to further include:
a heat exchanger to dissipate heat from the fluid of the loop; and
a fan to dissipate heat from the heat exchanger.

5. The apparatus of claim 4, wherein the cold reservoir is to absorb heat from the fluid of the loop after the heat exchanger has dissipated heat from the fluid of the loop.

6. The apparatus of claim 5, wherein the pump of the working fluid loop is powered on in response to the mobile computing device receiving power from an alternating current (AC) power outlet.

7. The apparatus of claim 4, wherein the fan is powered on in response to the heat generating unit reaching a given temperature.

8. The apparatus of claim 1, wherein the refrigerator is powered on in response to one or more events selected from a group of events consisting of: a source of power provided to the mobile computing device, a given detected temperature of the heat generating unit, a given detected internal ambient temperature of the mobile computing device and a level of power provided to the heat generating unit.

9. An apparatus comprising:
a refrigerator to be placed in a mobile computing device, the refrigerator including a cold reservoir and a hot reservoir, the cold reservoir to absorb heat generated by a heat generating unit of the mobile computing device;
a working fluid loop with a fluid of the working fluid loop being in thermal contact with the heat generating unit, the cold reservoir of the refrigerator to absorb heat from the fluid of the working fluid loop;
a heat exchanger to dissipate heat from the fluid of the loop;
a fan to dissipate heat from the heat exchanger; and
a pump to circulate the fluid of the working fluid loop between the heat generating unit and the cold reservoir, wherein at least one of the refrigerator, the pump and the fan are selectively powered off in response to the mobile computing device receiving power from a battery power source.

10. The apparatus of claim 9, further comprising a second heat exchanger to dissipate heat from the hot reservoir of the refrigerator.

11. The apparatus of claim 9, wherein the refrigerator comprises one of: a vapor compression refrigerator, a thermoelectric refrigerator, a thermoionic refrigerator, a magnetic refrigerator, a thermo acoustic refrigerator and an absorption refrigerator.

* * * * *

UNITED STATES PATENT AND TRADEMARK OFFICE
CERTIFICATE OF CORRECTION

PATENT NO. : 7,281,388 B2
APPLICATION NO. : 10/816009
DATED : October 16, 2007
INVENTOR(S) : Pokharna et al.

It is certified that error appears in the above-identified patent and that said Letters Patent is hereby corrected as shown below:

On the title page, in field (75), in "Inventors", in column 1, line 1, delete "Pokhama," and insert -- Pokharna, --, therefor.

Column 4, line 24, in Claim 8, delete "of:" and insert -- of; --, therefor.

Column 4, line 52, in Claim 11, delete "thermoionic" and insert -- thermionic --, therefor.

Signed and Sealed this

Twenty-fifth Day of December, 2007

JON W. DUDAS
*Director of the United States Patent and Trademark Office*